United States Patent Office 2,723,970
Patented Nov. 15, 1955

2,723,970
INTERPOLYMERS OF A DIFLUORODICHLOROETHYLENE, A 1,3-BUTADIENE HYDROCARBON AND AN ALKYL ACRYLATE

Vernon L. Folt and Earl J. Carlson, Akron, Ohio, assignors to The B. F. Goodrich Company, New York, N. Y., a corporation of New York No Drawing. Application August 27, 1952,
Serial No. 306,716

9 Claims. (Cl. 260—80.7)

This invention relates to novel polymeric materials and relates particularly to interpolymers of a difluorodichloroethylene, a 1,3-butadiene hydrocarbon and an alkyl acrylate and the preparation thereof.

It is well known that many high molecular weight thermoplastic polymers such as polyvinyl chloride must ordinarily be mixed with a plasticizer in order to form useful flexible products therefrom. It is also known that such mechanical mixtures have several undesirable characteristics. For example, plasticizers such as the organic esters, tend to migrate, absorb foreign materials which often discolor the composition and they may be leached out of the plastic composition under certain service conditions. Therefore, it is an object of this invention to prepare polymeric materials of a plastic nature that may be used as such in preparing flexible products thus eliminating the undesirable effects accompanying use of plasticizers. Other objects will appear hereinafter.

We have now discovered that these objects are attained in a new and useful class of high molecular weight thermoplastic materials which are interpolymers of (1) a difluorodichloroethylene, preferably 1,1-difluoro-2,2-dichloroethylene, (2) a 1,3-butadiene hydrocarbon, preferably 1,3-butadiene, and (3) an alkyl acrylate.

In preparing the interpolymers of this invention a monomeric mixture composed of from 20 to 50 mol percent, of a 1,3-butadiene hydrocarbon, 40 to 70 mol percent of the difluorodichloroethylene and 10 to 40 mol percent of an alkyl acrylate is polymerized by any of the free radical techniques known to and used by those skilled in the art. The resulting polymer is freed of the reacting media and dried. The solid interpolymers so obtained are high molecular weight plastics which are tough, clear, colorless, flexible and flame resistant. The interpolymers of this invention have a wide variety of physical properties, and quite unexpectedly we have found that the transition from very soft flexible materials to stiff leatherlike materials may be made by very small changes in the ratio of 1,1-difluoro-2,2-dichloroethylene to alkyl acrylate utilized.

It is quite surprising that interpolymers of these three monomers are formed by this reaction. When ethyl acrylate and 1,1-difluoro-2,2-dichloroethylene are copolymerized together, the copolymer formed is composed mostly of ethyl acrylate, but when a mixture of these three monomers are polymerized, a useful interpolymer containing substantial amounts of each monomer is obtained.

The preferred interpolymers of this invention are those prepared by polymerizing a three-component mixture containing from about 50 to 60 mol percent 1,1-difluoro-2,2-dichloroethylene, about 20 to 30 mol percent of an alkyl acrylate and about 20 mol percent of 1,3-butadiene. Within this range we have found that small variations in the monomer feed ratio of the difluorodichloroethylene and alkyl acrylate result in large differences in degree in the physical properties of the resulting interpolymers. For example, by polymerizing in aqueous emulsion a monomer mixture of 20 mol percent 1,3-butadiene, 50 mol percent 1,1-difluoro-2,2-dichloroethylene and 30 mol percent of ethyl acrylate, one is able to prepare a plastic interpolymer resembling in its feel, appearance and stress-strain characteristics a highly plasticized polyvinyl chloride composition. By similarly reacting a monomer mixture of 20 mol percent 1,3-butadiene, 60 mol percent 1,1-difluoro-2,2-dichloroethylene and 20 mol percent ethyl acrylate, a plastic interpolymer resembling in its stress-strain characteristics a high molecular weight polyethylene plastic is obtained. This interpolymer is different from polyethylene in that it is clear rather than cloudy.

The alkyl acrylates included within the scope of this invention are those which may be represented by the general formula

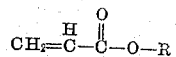

in which R may be methyl, ethyl, n-propyl, isopropyl, n-butyl, sec.-butyl, t-butyl, amyl, isoamyl, hexyl, heptyl, 2-ethyl hexyl, octyl, isooctyl and the like. The alkyl acrylates preferred are those which contain less than 12 carbon atoms. Mixtures of alkyl acrylates may be profitably employed in preparing the interpolymers. Acrylates such as chloroethyl acrylate may also be utilized.

Preferred embodiments of the invention are illustrated in the following examples in which parts are parts by weight.

Examples 1 through 5

In these examples mixtures of difluorodichloroethylene, 1,3-butadiene and ethyl acrylate are polymerized at 50° C. in aqueous emulsion with potassium persulfate to form plastic interpolymers by the following general procedure: Into a pressure reaction vessel equipped with means for agitation and temperature control is charged a soap solution consisting of 400 parts of water, 4 parts of a fatty acid soap and 1.8 parts of tertiary $C_{12}$ mercaptan, and 0.6 part of potassium persulfate dissolved in a small amount of water. The vessel is flushed well with nitrogen and cooled to about 0° C. A monomeric mixture is charged into the cooled reaction vessel and the vessel is sealed. The reactor is heated to 50° C. and the reaction allowed to proceed with agitation to the desired degree of conversion of monomer to polymer and the reaction stopped, either by adding 0.1 part of hydroquinone to the resulting latex or by venting the reactor and coagulating the solid polymer by the addition of methanol to the latex. After coagulation the solid polymer is washed well with water and dried at about 60° C. The solid interpolymers so obtained may be formed into sheets by either milling or molding under heat and pressure. The monomer ratios used in mol percent, the degree of conversion in percent and the test results for each of the several examples are shown in the following data table wherein the difluorochloroethylene employed is 1,1-difluoro-2,2-dichloroethylene.

| Example No. | Monomer Ratio, Mol Percent | | | Reaction Time, Hours | Conversion, Percent | Stress-Strain | | | Elastic Modulus, p. s. i. | Brittle Point, ° C. |
|---|---|---|---|---|---|---|---|---|---|---|
| | 1,3-butadiene | $CF_2CCl_2$ | Ethyl Acrylate | | | Tensile Strength, p. s. i. | Yield Point, p. s. i. | Elongation, Percent | | |
| 1 | 20 | 60 | 20 | 5.4 | 32.4 | 1,967 | 2,016 | 285 | 5,553 | 0 |
| 2 | 20 | 60 | 20 | 24.0 | 53.4 | 1,755 | 1,562 | 295 | 2,569 | >7.5 |
| 3 | 20 | 57.5 | 22.5 | 6.0 | 27.9 | 1,540 | 1,432 | 378 | 4,177 | 5.0 |
| 4 | 20 | 57.5 | 22.5 | 24.0 | 45.8 | 1,481 | 1,020 | 366 | 2,200 | >7.5 |
| 5 | 20 | 55 | 25 | 6.0 | 27.6 | 1,287 | 1,210 | 295 | 2,946 | >7.5 |

These examples illustrate very clearly the variety of properties obtained in these interpolymers with only minor variations in the ratio of 1,1-difluoro-2,2-dichloroethylene and ethyl acrylate, and in the degree of conversion. All of the interpolymers of these examples are clear, tough, flexible materials. The yield point is understood to be that point in the tension measurement at which there is rapidly increasing elongation or stretch with little increase in the load being applied.

In these examples, as the conversion is increased the yield points decrease, the elastic moduli decrease, and generally the amount of bound 1,1-difluoro-2,2-dichloroethylene decreases and the bound ethyl acrylate content increases. It will be seen that physical properties of plastics from a fixed monomer feed ratio may be readily varied by varying the degree of conversion. It will be noted also that at constant conversion, slight changes in the ratio of 1,1-difluoro-2,2-dichloroethylene to ethyl acrylate result in plastics with different physical properties. On analysis these interpolymers were found to contain about 33 to 37 mol percent bound 1,1-difluoro-2,2-dichloroethylene.

Further examples of the variety of plastics that may be prepared in accordance with the invention will be found in Examples 6 through 11.

Examples 6 through 11

A series of interpolymers of the monomer feed ratio indicated in the table below are prepared in essentially the same manner described in Examples 1 through 5. The physical properties of the plastics so obtained are tabulated for comparison purposes.

| Example No. | Monomer Ratio, Mol Percent | | | Polymer Nature | Stress-Strain | | | | |
|---|---|---|---|---|---|---|---|---|---|
| | 1,3-butadiene | $CF_2CCl_2$ | Ethyl Acrylate | | Tensile Strength, p. s. i. | Yield Point, p. s. i. | Modulus, 300%, p. s. i. | Elongation, Percent | Elastic Modulus, p. s. i. |
| 6 | 50 | 40 | 10 | Flexible | 1,881 | ------ | 1,428 | 403 | 2,245 |
| 7 | 40 | 50 | 10 | do | 3,237 | ------ | 1,406 | 572 | 2,570 |
| 8 | 40 | 40 | 20 | do | 1,632 | 670 | 729 | 649 | 492 |
| 9 | 30 | 60 | 10 | Stiff Rubber | 3,400 | 1,200 | 2,345 | 470 | 5,470 |
| 10 | 20 | 70 | 10 | Stiff Plastic | 4,420 | 3,670 | 2,915 | 470 | 34,150 |
| 11 | 20 | 60 | 20 | do | 3,415 | 2,390 | 2,535 | 465 | 19,400 |

Isoprene, dimethyl butadiene and the like may be substituted in part or wholly for 1,3-butadiene in these examples. Although 1,2-difluoro-1,2-dichloroethylene does not copolymerize as readily as 1,1-difluoro-2,2-dichloroethylene, it may also be substituted in part or wholly for the latter monomer. When other alkyl acrylates are substituted in the above examples similarly useful plastic products are obtained.

No special polymerization conditions are required for the preparation of the interpolymers of this invention as a class. The interpolymers may be prepared by any of the techniques known to and used by those skilled in the art such as bulk, solution, suspension and emulsion. Aqueous emulsion or suspension polymerizations are preferred for practical reasons of cost and ease of operation in the preparation of the solid interpolymers. For polymers intended as adhesives and for coatings, solution polymerization may be preferred. The interpolymers may be prepared by batch or continuous processes and advantage may be taken of monomer proportioning techniques.

The polymerization reactions may be initiated by any of the free radical forming initiators ordinarily used, such as the oxygen containing per-compounds represented by potassium persulfate, benzoyl peroxide, cumene hydroperoxide and the like, the catalyst being oil or water soluble depending upon the nature of the polymerization system employed. The so-called Redox systems consisting of reducing-oxidizing couples may be used, especially at the lower temperatures of polymerization. Reducing agents employed in such systems may be polyamines, sugars, heavy metal complexes and the like, and the oxidizing agents employed may be the catalysts listed above as well as hydrogen peroxide, t-butyl hydroperoxide, terpene hydroperoxides and the like. The azo materials such as alpha-alpha' azodiisobutyronitrile also may be profitably employed as initiators.

The temperature at which the polymerization reaction is conducted may be any desired in the normal ranges ordinarily employed such as from 0° C. to 100° C. For practical purposes the interpolymers are preferably prepared at temperatures from 40 to 60° C.

Emulsifiers for emulsion polymerization systems may be surface active agents such as fatty acid, rosin acid or amine soaps, alkyl, aryl, aralkyl sulfonates or sulfates or mixtures thereof and the like. The potassium soaps are preferred for low temperature polymerizations. Concentrations of from 1 to 5 parts by weight per 100 parts of monomer are adequate. For suspension systems, agents like gelatin, casein, clay, and polyvinyl alcohol may be used alone or in conjunction with small amounts of a surface active agent. The amount used will depend upon the type and degree of agitation employed, as is well known; and 0.1 to 0.5 part are usually employed.

The solvents and diluents utilized in solution polymerization will be determined by the end result desired. If a solution of the interpolymer is desired, an aromatic solvent such as benzene may be used. If it is desired that the interpolymer separate on forming, butane or hexane may be employed. This selection is well known to those skilled in the art.

Modifying agents usually employed in the free radical polymerization of unsaturated monomers containing an ethylenic double bond, such as sulfur containing agents represented by the alkyl mercaptans and xanthogen disulfides, may be employed. Halogen containing compounds such as carbon tetrachloride may be utilized. These modifiers may be utilized to control the molecular weight and molecular distribution of the copolymers as well as the degree of branching and cross-linking in the polymer chain. The use of a modifying agent seems to be essential to obtain a soluble copolymer for cement applications. About 0.5 to 1.5 parts of modifier are usually employed.

Good quality 1,1-difluoro-2,2-dichloroethylene is preferred for use in preparing the interpolymers. Inert impurities are not objectionable but presence of hydrogen fluoride may interfere with the polymerization reaction rate. The monomer should be protected from long and continued exposure to moisture and air. Polymerization grade 1,3-butadiene and alkyl-acrylate, 95 percent or better purity are preferred but lower purity material may be used.

The interpolymers of this invention may be further modified by the addition of small amounts of organic plasticizers to the plastic if desired, either in the latex stage or during later processing. Examples of plasticizers useful for such a purpose are the organic esters such as dioctyl phthalate, dioctyl adipate, tricresyl phosphate and the like.

The polymerization reactions may be stopped at any desired degree of conversion by the addition of reducing agents such as a hydroquinone, preferably one of the non-discoloring derivatives, or by coagulating the polymer as rapidly as possible. Small amounts, usually about 0.1 part of the reducing agents are employed. The coagulation is effected generally by the addition of solvents such as alcohol, acetone and the like, but the interploymer may be freed from the reacting media by salt-acid coagulation.

The unique class of plastic materials which are the products of this invention are adapted to a variety of uses. They may be used in molding applications as molded goods, as films, as adhesive, in coating applications and similar uses. They are especially useful in applications where plasticized polymers are used under service conditions where the plasticizer would migrate into surrounding areas as where the plasticizer would be leached out or other applications where a flexible unplasticized polymer is desired.

Accordingly, this invention provides a new and useful class of plastic materials and methods for producing them. It is not intended therefore that the invention be limited except by the spirit and scope of the appended claims.

We claim:

1. A plastic interpolymer of a monomeric mixture comprising 20 to 50 mol percent of a 1,3-butadiene hydrocarbon, 40 to 70 mol percent of a difluorodichloroethylene and 10 to 40 mol percent of an alkyl acrylate containing less than 12 carbon atoms.

2. The plastic interpolymer of claim 1 wherein the 1,3-butadiene hydrocarbon is 1,3-butadiene.

3. The plastic interpolymer of claim 1 wherein the difluorodichloroethylene is 1,1-difluoro-2,2-dichloroethylene.

4. A plastic interploymer of a monomeric mixture comprising about 20 mol percent of 1,3-butadiene, 50 to 60 mol percent of 1,1-difluoro-2,2-dichloroethylene and 20 to 30 mol percent of an alkyl acrylate containing less than 12 carbon atoms.

5. The plastic interpolymer of claim 4 wherein the alkyl acrylate is a mixture of alkyl acrylates containing less than 12 carbon atoms.

6. A plastic interpolymer of a monomeric mixture of a 1,3-butadiene, 1,1-difluoro-2,2-dichloroethylene and an alkyl acrylate containing less than 12 carbon atoms, which comprises 30 to 40 mol percent combined 1,1-difluoro-2,2-dichloroethylene in the polymer.

7. The method which comprises polymerizing a monomeric mixture containing 20 to 50 mol percent 1,3-butadiene hydrocarbon, 40 to 70 mol percent difluorodichloroethylene and 10 to 40 mol percent alkyl acrylate containing less than 12 carbon atoms.

8. The plastic interpolymer of claim 4 wherein the alkyl acrylate is ethyl acrylate.

9. The plastic interpolymer of claim 6 wherein the alkyl acrylate is ethyl acrylate.

References Cited in the file of this patent

UNITED STATES PATENTS

| | | |
|---|---|---|
| 2,584,126 | Hanford | Feb. 5, 1952 |
| 2,657,199 | Folt et al. | Oct. 27, 1953 |